United States Patent
Ishiyama et al.

(10) Patent No.: US 7,557,827 B2
(45) Date of Patent: Jul. 7, 2009

(54) PRINT SYSTEM, INCLUDING A PRINTER AND PRINTER CONTROLLING DEVICE WHICH COMMUNICATE VIA MULTIPLE COMMUNICATION CHANNELS

(75) Inventors: Eiji Ishiyama, Saitama (JP); Mikio Watanabe, Saitama (JP); Hiroshi Tanaka, Saitama (JP); Hisayoshi Tsubaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 720 days.

(21) Appl. No.: 10/808,461

(22) Filed: Mar. 25, 2004

(65) Prior Publication Data
US 2004/0189811 A1 Sep. 30, 2004

(30) Foreign Application Priority Data
Mar. 25, 2003 (JP) ............................. 2003-082087

(51) Int. Cl.
*H04N 5/225* (2006.01)
(52) U.S. Cl. .................................................. 348/207.2
(58) Field of Classification Search ............. 348/207.2, 348/552, 207.99; 358/1.1, 1.2, 1.15, 3.23, 358/296; 248/207.2
See application file for complete search history.

(56) References Cited

U.S. PATENT DOCUMENTS

| | | | | |
|---|---|---|---|---|
| 4,622,682 A | * | 11/1986 | Kumakura | 375/285 |
| 6,115,137 A | * | 9/2000 | Ozawa et al. | 358/1.6 |
| 6,166,825 A | * | 12/2000 | Shaklee et al. | 358/1.15 |
| 6,690,417 B1 | * | 2/2004 | Yoshida et al. | 348/231.1 |
| 6,771,896 B2 | * | 8/2004 | Tamura et al. | 396/57 |
| 6,996,096 B2 | * | 2/2006 | Niida et al. | 370/360 |
| 6,999,113 B1 | * | 2/2006 | Omura | 348/207.2 |
| 7,038,714 B1 | * | 5/2006 | Parulski et al. | 348/207.2 |
| 7,042,496 B2 | * | 5/2006 | Sato | 348/207.2 |
| 2002/0140963 A1 | * | 10/2002 | Otsuka | 358/1.14 |
| 2003/0016378 A1 | * | 1/2003 | Ozawa et al. | 358/1.13 |
| 2003/0072032 A1 | * | 4/2003 | Maemura | 358/1.15 |
| 2003/0095275 A1 | * | 5/2003 | Christodoulou et al. | 358/1.12 |
| 2004/0150840 A1 | * | 8/2004 | Farrell et al. | 358/1.1 |
| 2004/0168001 A1 | * | 8/2004 | Szabelski | 710/62 |

FOREIGN PATENT DOCUMENTS

| | | | |
|---|---|---|---|
| JP | 10-224591 | * | 8/1998 |
| JP | 11-277840 A | | 10/1999 |
| JP | 2001-310532 A | | 11/2001 |

* cited by examiner

*Primary Examiner*—Tuan V Ho
*Assistant Examiner*—Kent Wang
(74) *Attorney, Agent, or Firm*—Sughrue Mion, PLLC

(57) ABSTRACT

A print system comprises a digital camera and a printer. The digital camera photographs a subject and produces image data. Print data including print-setting data and printing data is produced from the image data and print setting information. The digital camera is provided with a high-speed radio I/F and a low-speed radio I/F. The printer is also provided with a high-speed radio I/F and a low-speed radio I/F. The setting data is transferred from the digital camera to the printer through the low-speed radio I/F. The printing data is transferred from the digital camera to the printer through the high-speed radio I/F. The printer prints an image of the subject on the basis of the print data transferred from the digital camera to the printer.

25 Claims, 6 Drawing Sheets

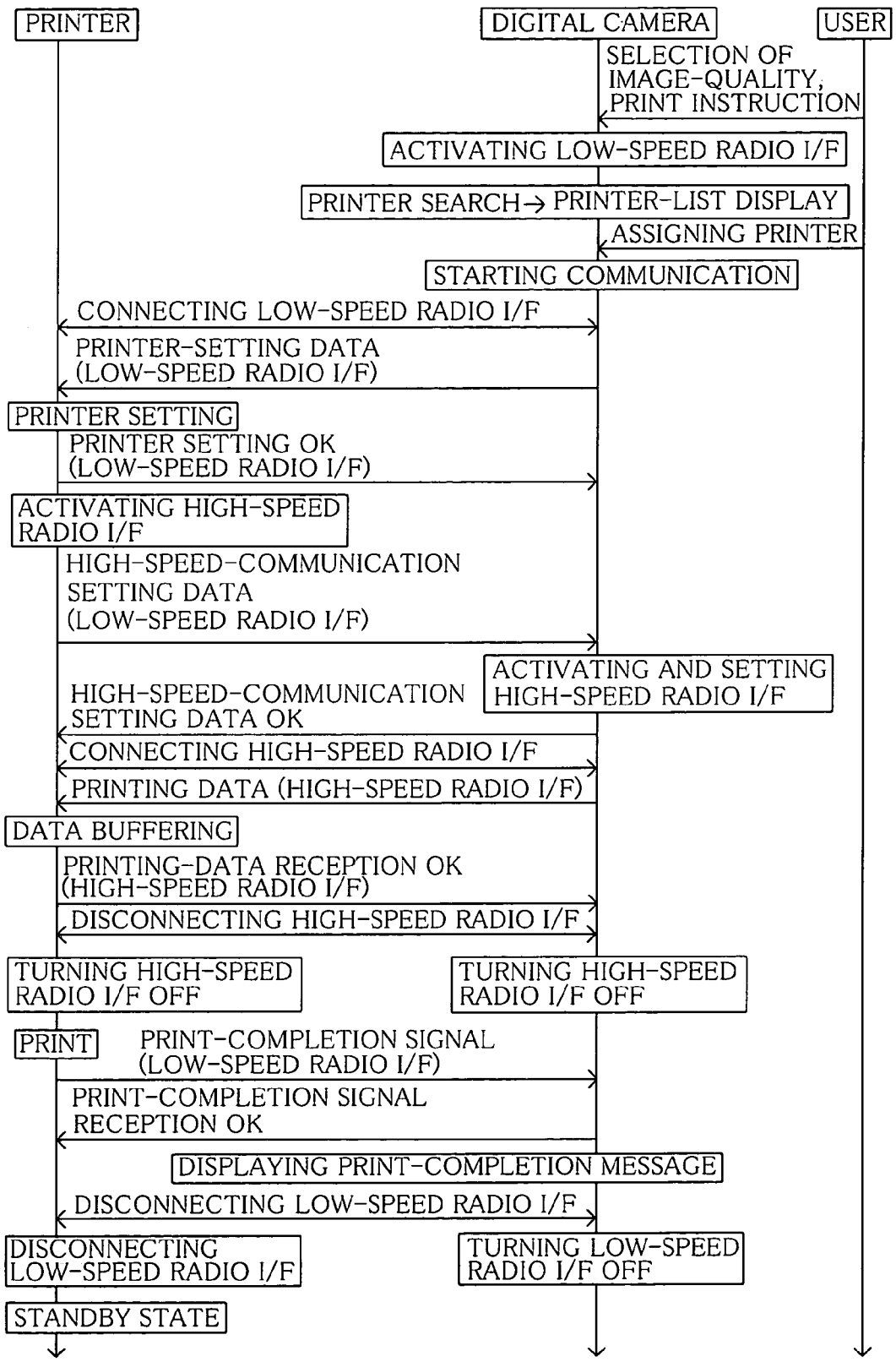

PRINT SYSTEM, INCLUDING A PRINTER AND PRINTER CONTROLLING DEVICE WHICH COMMUNICATE VIA MULTIPLE COMMUNICATION CHANNELS

BACKGROUND OF THE INVENTION

1. Field of the Invention

The present invention relates to a print system comprising a printer and a printer controlling device, and particularly relates to a print system in which data is transferred and received by selectively using a plurality of radio communication members.

2. Description of the Related Art

In a print system including a printer and a printer controlling device, the printer performs printing on the basis of print data inputted from the printer controlling device. In the printer, the print data inputted from the printer controlling device is converted into image data of a raster form. Printing is performed on the basis of the image data. Conventionally, the print data is transferred and received via a wire cable of RS-232C and so forth. However, as a radio communication technique develops, it is established to transfer and receive the data by utilizing the radio communication. As to the radio communication, a negotiation proceeds with a communication partner before starting the communication to interchange a communication form, a communication protocol and so forth. In this way, a radio communication channel is ensured.

Some of the print systems utilizing the radio communication build a network wherein plural printers are used (see Japanese Patent Laid-Open Publication No. 2001-310532, for instance). In this kind of the print system, status data of the respective printers is transferred by using the radio communication channel. On the basis of the status data, print data taken in the printer having many print jobs is transferred to the other printer through a wire communication channel so that it is possible to carry out effective printing operations.

In the print system described in the above-noted Patent Publication, since the print data is transferred and received through the wire communication channel, portability of the printer lacks. In contrast, there are some print systems wherein the print data is inputted into the printer by utilizing both of the radio communication and optical communication (see Japanese Patent Laid-Open Publication No. 11-277840). In this print system, a portable printer comprises an interface for the optical communication, an interface for the radio communication, and a change-over member for switching these interfaces. The interface to be used is automatically selected in accordance with a signal format of the print data.

In the above-mentioned printer, either of the radio interface and the optical interface is used depending on the signal format of the print data. Accordingly, in order to keep both of the radio interface and the optical interface in a receivable state, it is necessary to continuously supply an electric power to both of them. Under a condition that an exclusive power source of a battery or the like is merely provided, the usable duration of the printer is affected. Meanwhile, the communication interface to be used at the transmission time is selected by a user. An operation of this selection is troublesome for the user. If the user mistakenly selects the interface, a data-transfer rate becomes late. Consequently, it becomes difficult to perform effective data communication.

SUMMARY OF THE INVENTION

In view of the foregoing, it is a primary object of the present invention to provide a print system in which print data is inputted from a printer-controlling device to a printer easily and briefly.

It is a second object of the present invention to provide a print system in which print data is inputted from a printer-controlling device to a printer with a little consumption of electric power.

In order to achieve the above and other objects, the print system according to the present invention comprises the printer-controlling device and the printer, which performs printing on the basis of the print data including a plurality of data segments inputted from the printer-controlling device. The print system has first and second communication units for conducting data communication between the printer-controlling device and the printer. The second communication unit conducts the data communication at lower speed in comparison with the first communication unit. Predetermined data segment is transferred from the printer-controlling device to the printer by using the first communication unit. The other data segment is transferred from the printer-controlling device to the printer by using the second communication unit.

In a preferred embodiment, when reception of the predetermined data segment is not conducted, the first communication unit is turned off. The predetermined data segment concerns image data, and the other data segment concerns print-setting data to be used for setting print conditions of the printer.

The printer-controlling device is a digital camera, which photographs a subject to produce the image data. Further, the digital camera produces the print data by adding the print-setting data to the image data.

The printer according to the present invention receives the print data to print an image on the basis of the print data. The printer comprises first and second communication members. The first communication member of the printer receives the image data of the print data. The second communication member of the printer receives the print-setting data of the print data at lower speed in comparison with the first communication member thereof. When the reception of the image data is not conducted, the first communication member of the printer is turned off.

The printer-controlling device according to the present invention transfers the print data to the printer. The printer-controlling device comprises first and second communication members. The first communication member of the printer-controlling device transfers the image data of the print data. The second communication member of the printer-controlling device transfers the print-setting data of the print data at lower speed in comparison with the first communication member thereof. When the transmission of the image data is not conducted, the first communication member of the printer-controlling device is turned off In the print system according to the present invention, the print data is transferred from the printer-controlling device to the printer by selectively using the first and second communication units. In virtue of this, the transfer time of the print data may be shortened. Moreover, when the transmission of the predetermined data segment is not conducted, the first communication unit is turned off so that standby electric power of the printer may be reduced.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 6 is a flowchart showing an operational relationship between the digital camera and the printer.

DETAILED DESCRIPTION OF THE PREFERRED EMBODIMENT(S)

Figure 1:
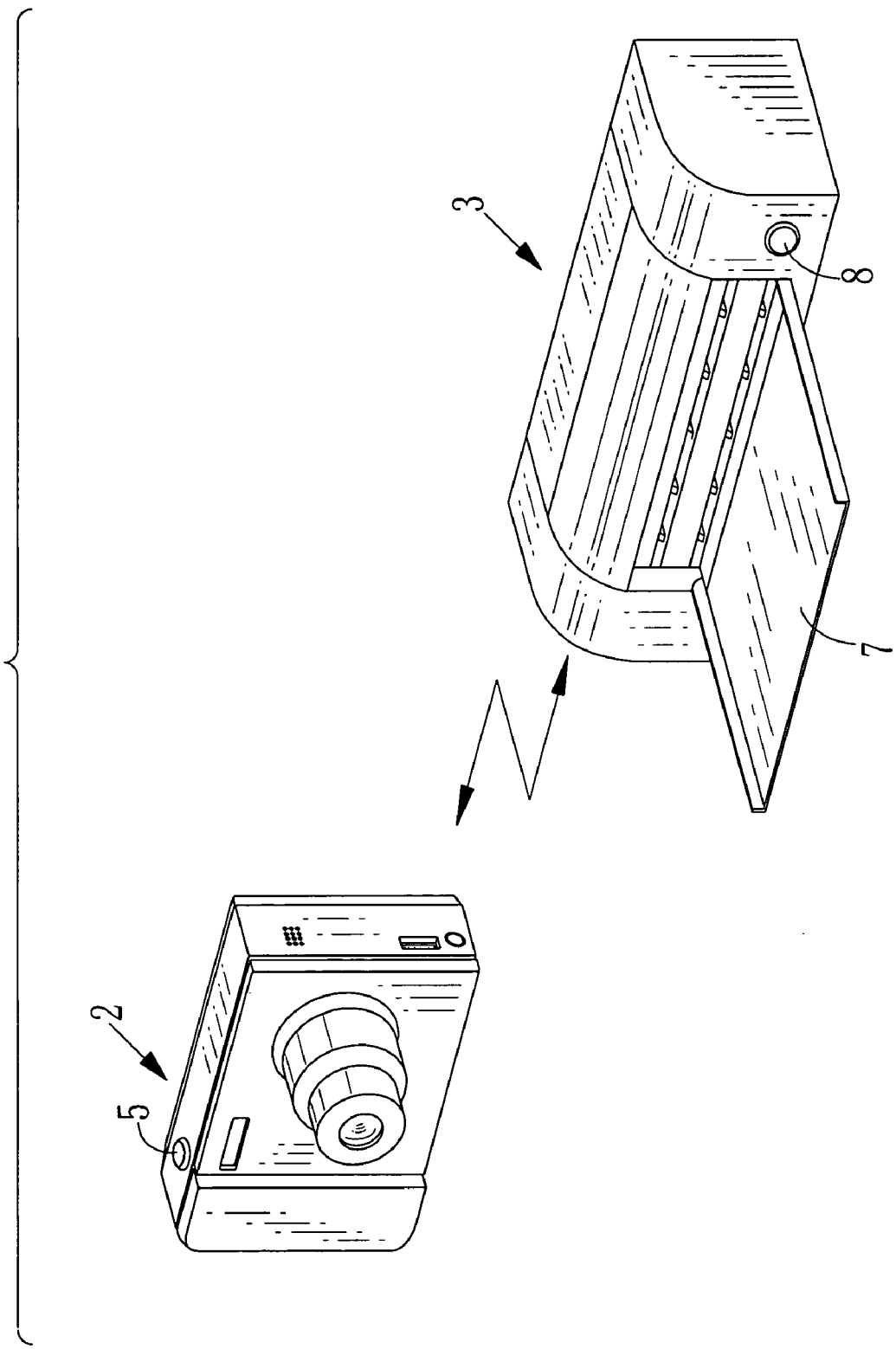
FIG. 1 is a perspective view showing the whole print system according to the present invention.

FIG. 1 is an explanatory illustration briefly showing the whole of a print system according to the present invention. The print system is constituted of a digital camera 2 and a portable printer 3. Upon depressing a shutter button 5, the digital camera 2 photographs a subject and records produced image data in a recording medium. The digital camera 2 comprises antennas, one of which is for low-speed radio communication and the other of which is for high-speed radio communication. When a user operates a button and instructs the printer 3 to print an image, print data including two data segments is produced. One of the data segments concerns setting data for the printer 3, and the other thereof concerns printing data based on the image data. The print data is transferred from the digital camera 2 to the printer 3.

The printer 3 is provided with a detachable paper table 7 for placing recording papers. A side of the printer 3 is provided with a power button 8. The printer 3 comprises antennas, one of which is for low-speed radio communication and the other of which is for high-speed radio communication. By using these antennas, the print data transmitted from the digital camera 2 is received. In accordance with the setting data included in the print data, print conditions are set. Printing the subject image is carried out on the basis of the printing data included in the print data.

Figure 2:
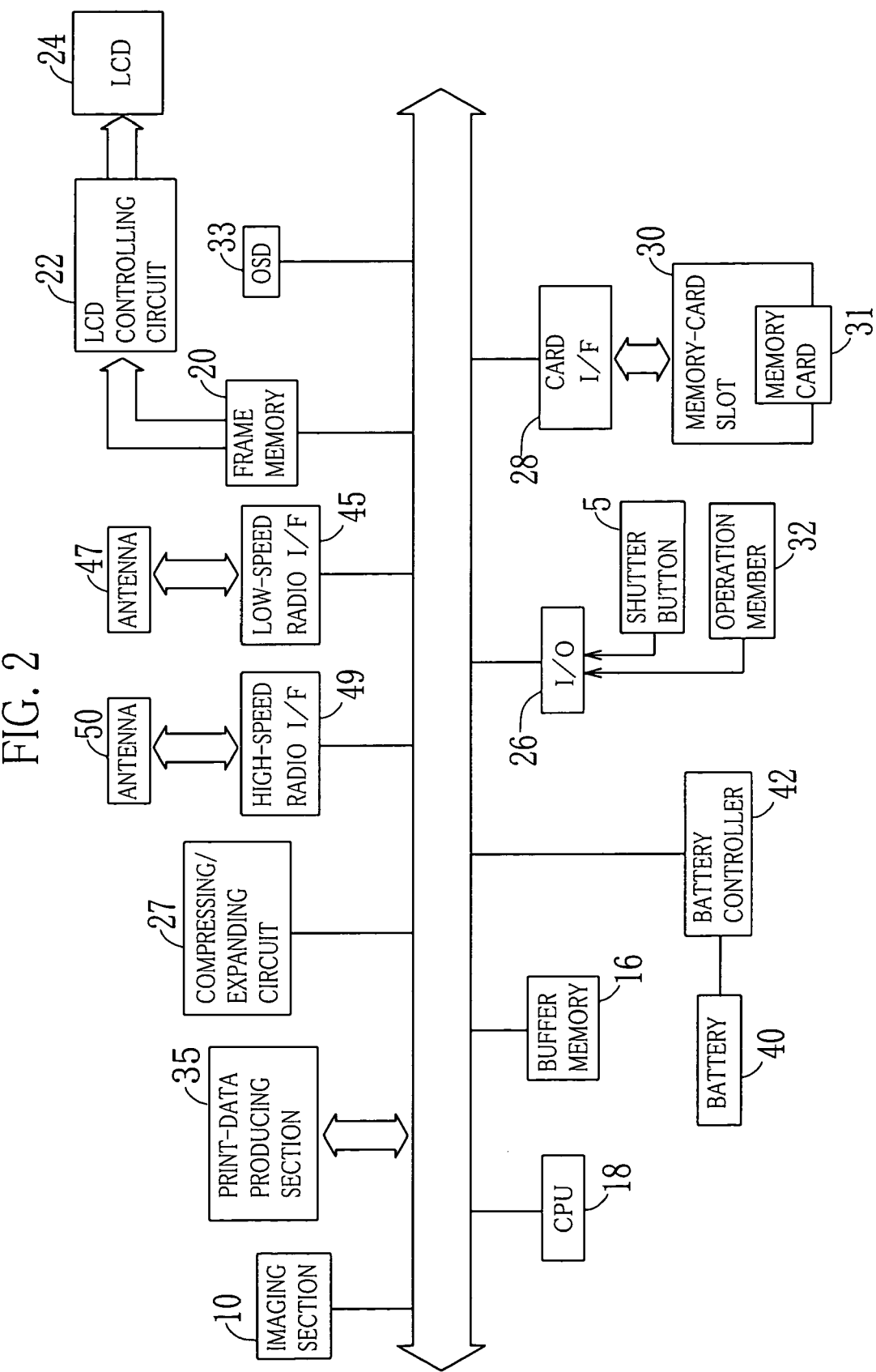
FIG. 2 is a block diagram of a digital camera constituting the print system.

FIG. 2 shows a simple block diagram of the digital camera 2. An imaging section 10 comprises a taking lens, a CCD image sensor, a signal processing circuit and an A-D converter circuit. The image of the subject is formed on the CCD image sensor through the taking lens. The subject image formed on the CCD image sensor is photoelectrically converted into an image signal. This image signal is inputted into the signal processing circuit constituted of a correlated double sampling circuit and an amplifier circuit. The correlated double sampling circuit converts the image signal into a RGB analog signal every cell of the CCD image sensor. The RGB analog signal is amplified in the amplifier circuit. The amplified RGB analog signal is inputted into the A-D converter circuit and is digitally converted into image data. The converted image data is temporarily stored in a buffer memory 16. The above sequential operation is controlled by a CPU 18, which also controls the whole operations of the digital camera.

The image data of the subject stored in the buffer memory 16 is inputted into an LCD controlling circuit 22 via a frame memory 20. In this circuit 22, the image data is converted into an NTSC composite signal, which is inputted into an LCD 24 to display an image of the subject on the LCD 24.

Under a photographic mode for photographing the subject, the subject image is continuously displayed on the LCD 24. Upon inputting a depression signal of the shutter button 5 via an I/O circuit 26, the image data obtained by photographing is compressed in a compressing/expanding circuit 27. The compressed image data is recorded in a memory card 31, which is inserted into a memory-card slot 30, via a card interface (hereinafter, called as card I/F) 28.

On the LCD 24, functions of the digital camera 2 are collectively displayed by means of an OSD (On Screen Display) 33. It is possible to select and execute the function from a menu displayed on the LCD 24. Meanwhile, a battery 40 supplies an electric power necessary for the operation of the digital camera 2. Supplying the electric power to each section of the digital camera is controlled by a battery controller 42.

Under a reproduction mode for reproducing the subject image, the image of the memory card 31 is optionally selected with an operation member 32. Further, the image data of the selected image is transferred to the printer to perform printing of the image.

The digital camera 2 is provided with a low-speed radio interface (hereinafter abbreviated as low-speed radio I/F) 45 and a high-speed radio interface (hereinafter abbreviated as high-speed radio I/F) 49, operations of which are controlled by the CPU 18. The low-speed radio I/F 45 conducts radio communication according to communication standard IEEE 802.11b of low speed and low consumption power. The high-speed radio I/F 49 conducts radio communication according to communication standard IEEE 802.11a of high speed and high consumption power. Antennas 47 and 50 for transferring and receiving the data are connected to the low-speed radio I/F 45 and the high-speed radio I/F 49 respectively.

The print data includes the print-setting data, which concerns information for setting the printer, and the printing data, which concerns contents to be printed. The print-setting data is produced by a print-data producing section 35 and includes various information regarding a print size, execution of color printing, an image-quality mode, a printing direction, and so forth. The print-setting data is settled by operating the operation member 32. The printing data is produced on the basis of the image data of the image to be printed. The print-setting data is modulated to a setting-data signal in the low-speed radio I/F 45 and is transferred from the antenna 47 to the printer. Meanwhile, the printing data whose data amount is great is modulated to a printing-data signal in the high-speed radio I/F 49 and is transferred from the antenna 50 to the printer.

Figure 3:
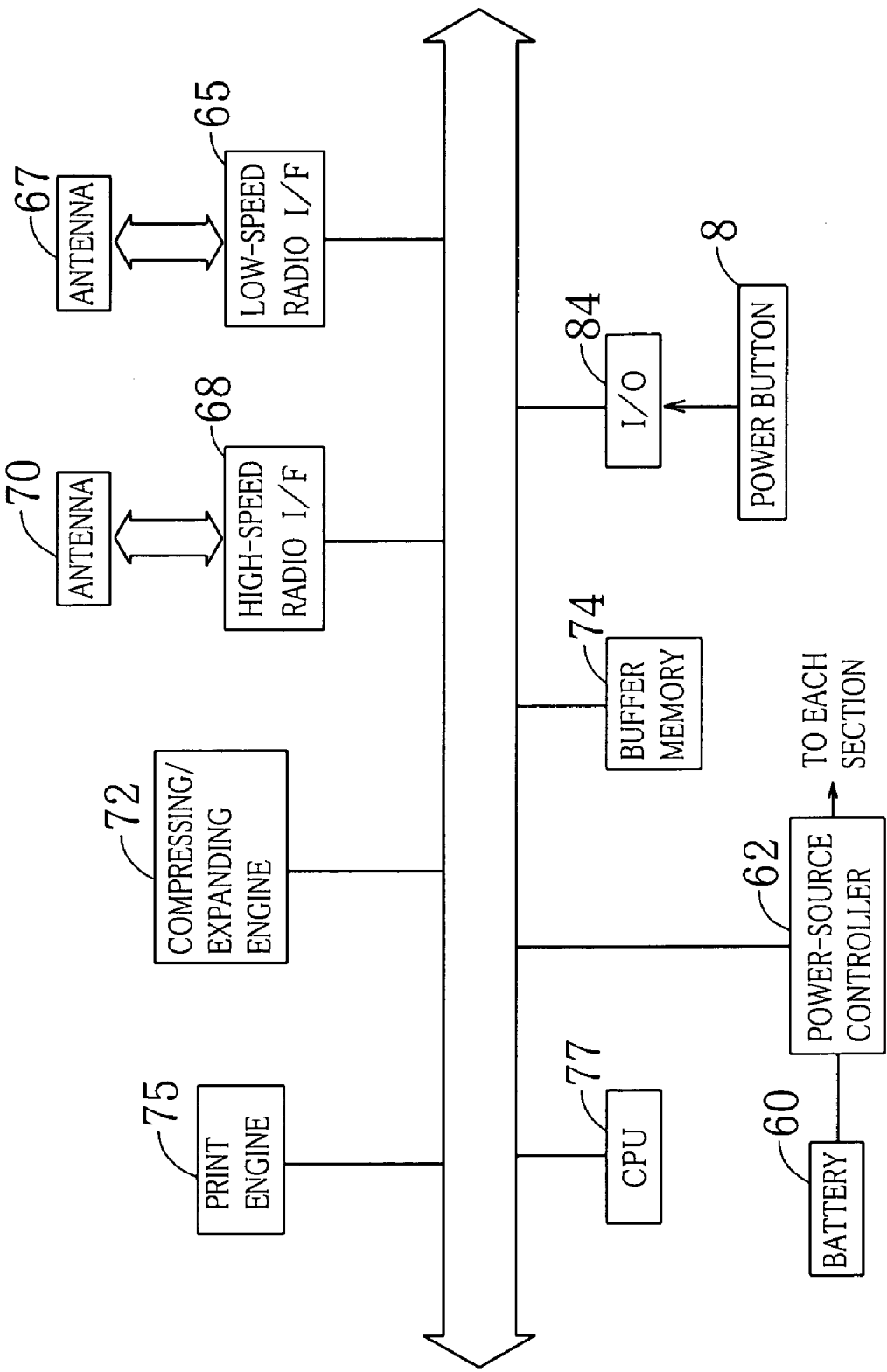
FIG. 3 is a block diagram of a printer constituting the print system.

FIG. 3 is a simple block diagram showing the portable printer 3. A battery 60 secures an electric power necessary for operating the printer 3. The electric power to be supplied to each section of the printer is controlled by a power-source controller 62.

The printer 3 is provided with a low-speed radio interface (hereinafter abbreviated as low-speed radio I/F) 65, an antenna 67, a high-speed radio interface (hereinafter abbreviated as high-speed radio I/F) 68, and an antenna 70. The low-speed radio I/F 65 conducts radio communication according to the communication standard IEEE 802.11b, and the high-speed radio I/F 68 conducts radio communication according to the communication standard IEEE 802.11a. The high-speed radio I/F 68 and the low-speed radio I/F 65 are respectively controlled by a CPU 77.

The low-speed radio I/F 65 receives the setting-data signal via the antenna 67 to obtain the print-setting data by modulating the setting-data signal. Meanwhile, the high-speed radio I/F 68 receives the printing-data signal via the antenna 70 to obtain the printing data by modulating the printing-data signal. The obtained print-setting data is temporarily stored in a buffer memory 74. Also, the printing data is temporarily stored in the buffer memory 74.

On the basis of the obtained print-setting data, setting of the printer 3 is carried out. The printing data is inputted into a compressing/expanding engine 72, and compression or expansion is executed on the basis of the print-setting data. After executing the compression/expansion, the printing data is temporarily stored in the buffer memory 74.

A print engine 75, which is controlled by the CPU 77, includes a data converter, a frame buffer and a printing section. The printing data stored in the buffer memory 74 is inputted into the data converter and is converted into image data of a raster form. The produced image data is developed in the frame buffer, and then, is inputted into the printing section to print the subject image on the basis of the image data.

Upon turning on the power button 8 of the printer 3, an instruction signal for starting the printer is inputted from an I/O circuit 84 into the CPU 77. In response to this, the power-source controller 62 supplies the electric power to each section of the printer so that the printer is started. When the data is not transferred and received, the CPU 77 activates only the low-speed radio I/F 65 to put the printer 3 in a waiting state. At this time, the high-speed radio I/F 68 is not activated. Meanwhile, when the printing data is received from the digital camera 2, the CPU 77 activates the high-speed radio I/F 68.

Between the low-speed radio I/F 45 of the digital camera 2 and the low-speed radio I/F 65 of the printer 3, the data is transferred and received according to the communication standard IEEE 802.11b. By contrast, between the high-speed radio I/F 49 of the digital camera 2 and the high-speed radio I/F 68 of the printer 3, the data is transferred and received according to the communication standard IEEE 802.11a. The print-setting data has a small data-amount so that transmission times of both of the communication systems are almost same. In view of this, a consumption power to be required for data transfer may be kept in a small amount by transferring and receiving the print-setting data via the low-speed radio interfaces 45 and 65. In the meantime, the printing data having a large data-amount is adapted to be received via the high-speed radio interfaces 49 and 68. In virtue of this, the data may be transferred in a brief time.

Figure 4:
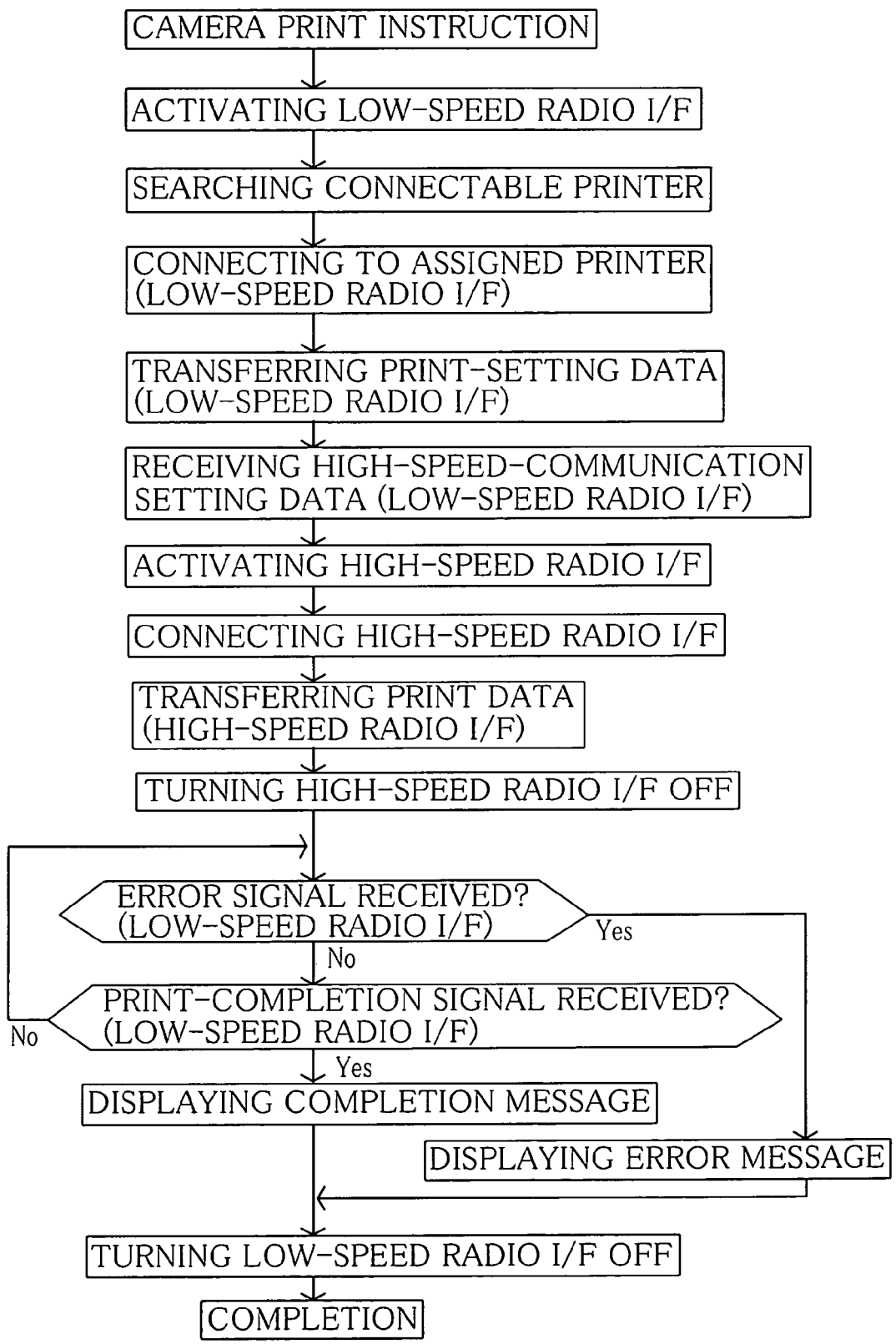
FIG. 4 is a flowchart showing an operational sequence of the digital camera.

An operation of the digital camera 2 is described below, referring to a flowchart shown in FIG. 4. Printing the subject image is instructed via the operation member 32. Upon this instruction, the low-speed radio I/F 45 is activated by a command of the CPU 18. Successively, a search signal for seeking the printer being connectable to the digital camera 2 is sent through the low-speed radio I/F 45 and from the antenna 47. As a result of seeking, a list of the connectable printers is displayed on the LCD 24. From this list, a user selects the printer to be used for printing.

When the user designates the printer 3, a negotiation for connecting is started to establish a low-speed radio communication-channel relative to the printer 3. A request signal for requesting the connection is sent to the low-speed radio I/F 65 of the printer 3. In response to this, an approval signal for approving the connection is returned from the printer 3. In this way, the low-speed radio communication-channel is established.

The digital camera 2 transfers the print-setting data to the printer 3 via the low-speed radio I/F 45. After that, the digital camera 2 receives a confirmation signal representing that the print-setting data is successfully received. Further, the digital camera 2 receives high-speed-communication setting data, which is necessary for establishing a high-speed radio communication-channel of MAC (Media Access Control) address and so forth, via the low-speed radio I/F 45. Thereupon, the CPU 18 activates the high-speed radio I/F 49 to conduct communication setting on the basis of the high-speed-communication setting data. And then, a confirmation signal representing reception of the high-speed-communication setting data is sent to the printer 3 via the low-speed radio I/F 45.

After sending the confirmation signal, a negotiation for connecting is started to establish the high-speed radio communication-channel relative to the printer 3. A request signal, which requests to connect with the high-speed radio I/F 68 of the printer 3, is sent through the low-speed radio I/F 45. In response to this, an approval signal for approving the connection is returned from the printer 3. In this way, the high-speed radio communication-channel is established relative to the printer 3.

After the establishment of the high-speed radio communication-channel, the printing data is inputted into the high-speed radio I/F 49 and is modulated to the printing-data signal therein. Further, the modulated printing-data signal is sent to the high-speed radio I/F 68. When the printing data has been received, a confirmation signal, which represents that the reception of the printing data has been completed, is sent from the high-speed radio I/F 68 to the high-speed radio I/F 49.

When the high-speed radio I/F 49 receives the confirmation signal, the digital camera 2 starts a negotiation for disconnecting the high-speed radio communication-channel. A request signal for requesting the disconnection of the high-speed radio communication-channel is sent to the printer 3 via the low-speed radio I/F 45, and an approval signal approving the disconnection is received from the printer 3. And then, the CPU 18 stops electrifying the high-speed radio I/F 49 to turn off it so that the high-speed radio communication channel is disconnected.

While the subject image is printed in the printer 3, the digital camera 2 waits in a state that only the low-speed radio I/F 45 is activated. When a print completion signal, which represents that the printing is completed, is received via the low-speed radio I/F 45, the LCD 24 displays a message showing the completion of printing. In case the printing is not normally performed, an error signal is received from the printer 3 to display an error message on the LCD 24.

When the LCD 24 displays the print completion message or the error message, a negotiation for disconnecting the low-speed radio communication-channel is started. Via the low-speed radio I/F 45, a request signal for requesting the disconnection of the low-speed radio communication-channel is sent from the antenna 47 to the printer 3. After that, an approval signal is received from the printer 3. Upon reception of this approval signal, the CPU 18 cuts off the low-speed radio I/F 45 so that the low-speed radio communication-channel is disconnected.

Figure 5:
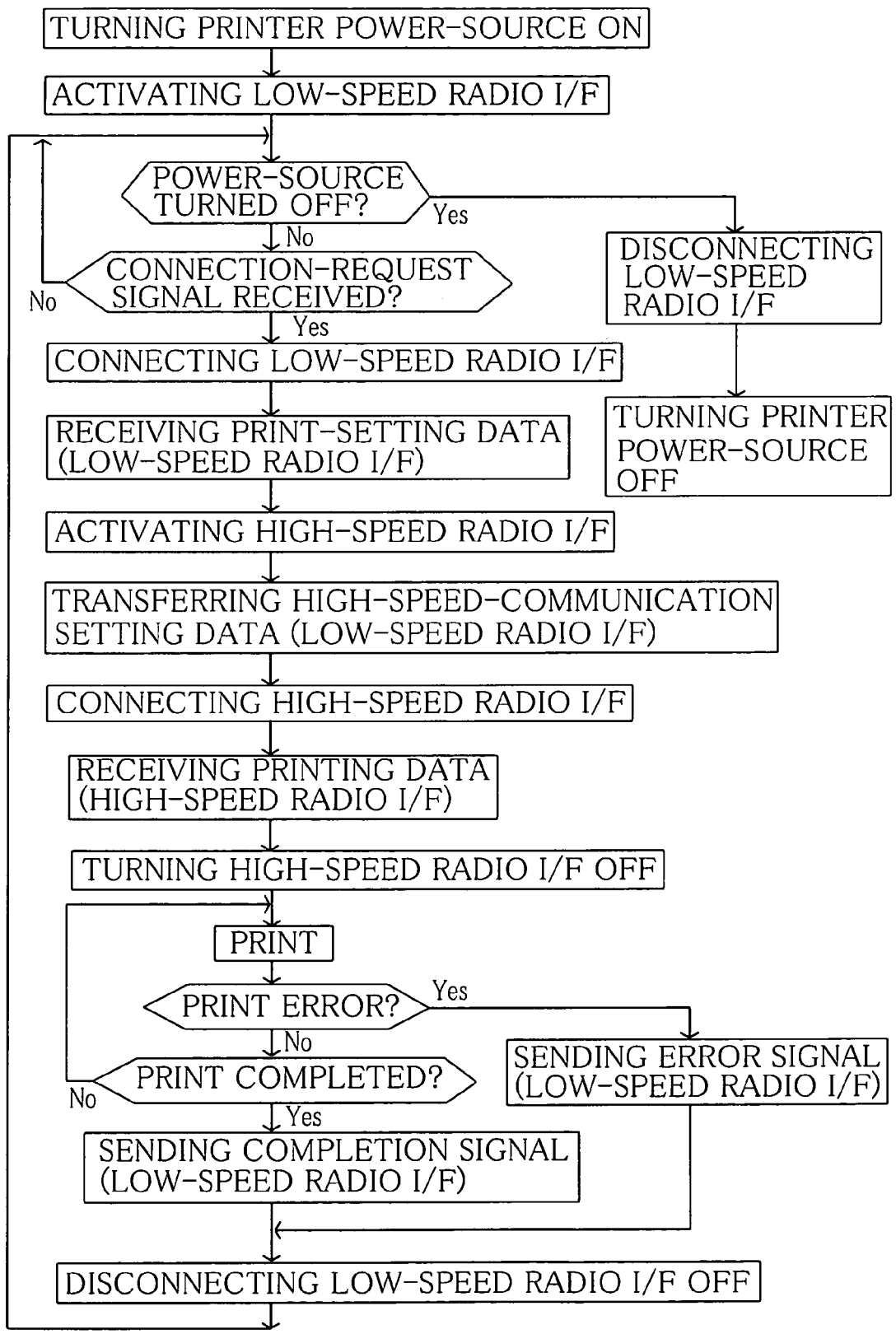
FIG. 5 is a flowchart showing an operational sequence of the printer.

An operation of the printer 3 is described bellow, referring to a flowchart shown in FIG. 5. When a power source of the printer 3 is turned on, the low-speed radio I/F 65 is automatically activated by a command of the CPU 77, and the printer 3 is kept in a waiting state.

When the low-speed radio I/F 65 receives the request signal, which represents the request for connection, from the digital camera 2, the printer 3 sends the approval signal, which represents the approval of the connection, to the digital camera 2. By the negotiation of the connection, the low-speed radio communication-channel is established between the low-speed radio I/F 65 and the low-speed radio I/F 45.

The low-speed radio I/F 65 receives the setting-data signal, which is sent from the digital camera 2, via the antenna 67 to obtain the print-setting data by demodulating the setting-data signal. The printer 3 sets the print size, the printing direction, the image-quality mode and so forth on the basis of the print-setting data. After that, the confirmation signal representing the setting completion of the printer 3 is sent to the digital camera 2 via the low-speed radio I/F 65.

After sending the confirmation signal to the digital camera 2, the CPU 77 activates the high-speed radio I/F 68. In accordance with this, the high-speed-communication setting data is transferred to the digital camera 2 by utilizing the low-speed radio communication channel. The high-speed-communication setting data is necessary for establishing the high-speed radio communication channel of the MAC address and so forth.

On the basis of the data sent for setting the high-speed communication, the digital camera 2 conduct the necessary setting for the high-speed radio communication. When the printer 3 receives the confirmation signal from the digital camera 2, the negotiation for connecting the high-speed radio communication-channel is started. Upon receiving the request signal for establishing the high-speed communication channel, the printer 3 conducts the necessary setting and sends the digital camera 2 the approval signal, which represents that the establishment of the high-speed radio communication-channel is approved. In this way, the high-speed radio communication-channel is established.

The printing-data signal is sent to the printer 3 by using the high-speed radio communication-channel. The printing-data signal is demodulated in the high-speed radio I/F 68 to obtain the printing data. When the printing-data signal has been received, the confirmation signal representing the successful reception of the printing-data signal is sent to the digital camera 2.

When the digital camera 2 receives the confirmation signal, the negotiation for disconnecting the high-speed radio communication-channel is started. The printer 3 receives the request signal, which requests the disconnection of the high-speed radio communication-channel, via the low-speed radio communication-channel. And then, the printer 3 sends the digital camera 2 the approval signal, which represents that the request signal is approved. After sending the approval signal, the CPU 77 stops to electrify the high-speed radio I/F 68 in order to turn off it so that the high-speed radio communication channel is disconnected.

The printer 3 drives the print engine 75 on the basis of the printing data and the print-setting data received from the digital camera 2 so that the subject image is printed. When the subject image has been printed, the printer 3 sends the print completion signal, which represents that the printing is completed, to the digital camera 2 through the low-speed radio communication channel. Meanwhile, in case it is detected that the image is not normally printed, the error signal is sent to the digital camera 2 through the low-speed radio communication channel.

When the printer 3 receives the request signal requesting the disconnection of the low-speed radio communication-channel, the CPU 77 recognizes this signal and the approval signal, which represents that the request signal is approved, is sent to the digital camera 2. Accordingly, the connection to the digital camera 2 is completely closed and the printer 3 is put in the waiting state. Upon depressing the power button 8 during the waiting time, the printer 3 cuts off the low-speed radio I/F 65. Further, the power source of the printer 3 is turned off.

Next, an operation of a print system having the above structure is described below, referring to FIG. 6. Incidentally, FIG. 6 shows a case in that printing is normally performed without occurrence of a print error. From among the image data recorded in the digital camera 2, the user selects an image to be printed. When the user instructs to print the selected image, the low-speed radio I/F 45 of the digital camera 2 is activated.

Via the activated low-speed radio I/F 45, the search signal for seeking the printer is sent from the antenna 47. After that, the list of the connectable printers is displayed on the LCD 24. When the user designates the printer 3 to print the image, the low-speed radio communication-channel is established between the digital camera 2 and the printer 3.

The print-setting data, which is necessary for printing and concerns the print size, the image quality and so forth, is inputted into the printer 3 through the low-speed radio communication-channel. Upon setting the print conditions on the basis of the print-setting data, the confirmation signal representing the setting completion of the printer 3 is sent to the digital camera 2. Successively, the high-speed radio I/F 68 of the printer 3 is activated.

The high-speed-communication setting data is transferred from the printer 3 to the digital camera 2 through the low-speed radio communication-channel. Upon receiving this data, the high-speed radio I/F 49 of the digital camera 2 is activated to conduct the setting for establishing the channel. Consequently, the high-speed radio communication-channel is established between the digital camera 2 and the printer 3.

The printing data whose data amount is large is transferred by using the established channel of the high-speed radio communication. In the printer 3, buffering of the data is carried out. After the printing data has been received and the confirmation signal has been sent from the printer 3 to the digital camera 2, the high-speed radio communication-channel is disconnected.

The printer 3 prints the subject image on the basis of the received printing data, and then, the signal representing the completion of printing is sent to the digital camera 2 to display the message of the print completion on the LCD 24. After displaying the message, the low-speed radio communication-channel is disconnected and the printer 3 is put in the waiting state. At this time, the high-speed radio I/F 68 is turned off so that the consumption power is saved during the waiting time.

In the above embodiment, the radio system of IEEE 802.11b is used for the low-speed radio communication channel, and the radio system of IEEE 602.11a is used for the high-speed radio communication channel. However, the other radio system may be used. For instance, Bluetooth may be used for the radio system of the low-speed radio communication channel, and IEEE. 802. 11b may be used for the radio system of the high-speed radio communication channel. By selectively using these radio communication channels, it is possible to transfer the print data from the digital camera to the printer.

In the above embodiment, the data communication is conducted by using one kind of each of the high-speed and low-speed radio communication channels. However, two or more kinds of communication systems may be used for the respective channels such as to be selectively used in accordance with communication conditions. For instance, IEEE 802.11a may be used for the high-speed radio communication, and IEEE 802.11b and Bluetooth may be used for the low-speed radio communication. Alternatively, IEEE 802.11a and IEEE 802.11b may be used for the high-speed radio communication, and Bluetooth may be used for the low-speed radio communication. Among the radio communication systems, any of them to be used may be determined depending on the types of the radio communication interfaces equipped in the printer and the digital cameras.

In the above embodiment, as to the print data including the print-setting data and the printing data, the print-setting data is transferred from the digital camera to the printer by using the low-speed radio I/F, and the printing data is transferred from the digital camera to the printer by using the high-speed radio I/F. However, the low-speed radio I/F may be used only for the waiting time, and the print-setting data and the printing data may be transferred from the digital camera to the printer by using the high-speed radio I/F. Owing to this, it is possible to shorten the transfer time of the print data from the digital camera to the printer. In a case that the print data includes data segments of three or more, the predetermined data segment may be inputted into the printer by using the low-speed radio I/F, and the other data segments may be inputted into the printer by using the high-speed radio I/F.

The above embodiment relates to the portable printer employing the built-in battery as the power source. However, a fixed-type printer employing a transformer and an AC power source of home use may be provided with a CPU for controlling the high-speed radio I/F and the low-speed radio I/F. In this case, the print data may be received by selectively using the low-speed and high-speed radio communication channels so that it is possible to provide a printer in which the consumption power is low.

In the above embodiment, the digital camera is used as a printer controlling device. However, a host computer temporarily storing the print data may be used. The host computer is provided with the high-speed radio I/F and the low-speed radio I/F by which the print data is transferred from the host computer to the printer. In this case, the print data may be transferred to the printer much faster.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A print system having a printer controlling device and a printer, which performs printing on the basis of print data including a plurality of data segments inputted from said printer controlling device, said print system comprising:

first communication means for conducting high-speed radio data-communication between said printer controlling device and said printer, the predetermined data segment being transferred from said printer controlling device to said printer by using said first communication means; and second communication means for conducting low-speed radio data-communication between said printer controlling device and said printer, the other data segment being transferred from said printer controlling device to said printer by using said second communication means, wherein the printer performs a print job based on the predetermined data segment and the other data segment, wherein only said first communication means is automatically turned off when the data communication of the predetermined data segment is not conducted, wherein said first communication means is automatically turned off after said predetermined data segment is transferred from said printer controlling device to said printer, and said first communication means remains turned off while the other data segment is being transferred from said printer controlling device to said printer using said second communication means.

2. A print system according to claim 1, wherein said predetermined data segment concerns image data and the other data segment concerns setting data for defining print conditions of said printer.

3. A print system according to claim 2, wherein said printer controlling device is a digital camera for producing said image data by photographing a subject and for producing said print data by adding the print-setting data to the image data.

4. A print system according to claim 3, wherein said first communication means is a pair of first radio interfaces for conducting said high-speed radio communication, and said second communication means is a pair of second radio interfaces for conducting said low-speed radio communication.

5. A print system according to claim 4, wherein said first communication means is based on a standard of IEEE802.11a, and said second communication means is based on a standard of IEEE802.11b.

6. A print system according to claim 4, wherein said first communication means is based on a standard of IEEE802.11b, and said second communication means is based on Bluetooth (trademark).

7. A print system according to claim 4, wherein said printer has a battery as a power source so as to be portable.

8. A print system according to claim 1, wherein said first communication means is turned off such that no power is supplied to said first communication means when the data communication of the predetermined data segment is not conducted.

9. A print system according to claim 1, wherein said first communication means and said second communication means are operable at frequencies less than 3 terahertz.

10. The print system according to claim 1, wherein the first communication means and the second communication means conduct the high-speed radio data-communication and the low-speed radio data-communication according to different communication standards, respectively.

11. The print system according to claim 1, wherein the predetermined data segment and the other data segment are included in the print data based on which the printer performs the print job.

12. A printer for receiving print data, which includes image data and print-setting data, and for printing an image on the basis of said print data, said printer comprising:

first communication means for receiving said image data in a high-speed radio manner; and second communication means for receiving said print-setting data in a low-speed radio manner, wherein only said first communication means is automatically turned off when reception of said image data is not conducted, wherein the first communication means is automatically turned off after said image data is received, and said first communication means remains turned off while the second communication means receives said print-setting data.

13. A printer according to claim 12, wherein said first communication means is a first radio interface for conducting radio communication, and said second communication means is a second radio interface for conducting radio communication.

14. A printer according to claim 13, wherein said printer is a portable type capable of being driven by a battery.

15. A printer according to claim 14, wherein said print-setting data of said print data includes information concerning a print size, an image-quality mode and a printing direction.

16. A printer according to claim 12, wherein said first communication means is turned off such that no power is supplied to said first communication means when the reception of said image data is not conducted.

17. A printer according to claim 12, wherein said first communication means and said second communication means are operable at frequencies less than 3 terahertz.

18. The printer according to claim 12, wherein the printer performs a print job based on the received image data and the received print-setting data.

19. A printer controlling device for transferring print data, which includes image data and print-setting data, to a printer, said printer controlling device comprising:

first communication means for transferring said image data in a high-speed radio manner; and second communication means for transferring said print-setting data in a low-speed radio manner, wherein only said first communication means is automatically turned off when transmission of said image data is not conducted, wherein the first communication means is automatically turned off after said image data is transferred, and said first communication means remains turned off while the second communication means transfers said print-setting data.

20. A printer controlling device according to claim 19, wherein said first communication means is a first radio interface for conducting radio communication, and said second communication means is a second radio interface for conducting radio communication.

21. A printer controlling device according to claim 20, wherein said print-setting data of said print data includes information concerning a print size, an image-quality mode and a printing direction.

22. A printer controlling device according to claim 21, wherein said printer controlling device is a digital camera.

23. A printer controlling device according to claim 19, wherein said first communication means is turned off such that no power is supplied to said first communication means when the transmission of said image data is not conducted.

24. A printer controlling device according to claim 19, wherein said first communication means and said second communication means are operable at frequencies less than 3 terahertz.

25. The printer controlling device according to claim 19, wherein the printer performs a print job based on the image data and the print-setting data.

* * * * *